(12) United States Patent
Bauer (10) Patent No.: US 7,258,245 B2
(45) Date of Patent: Aug. 21, 2007

(54) FUEL TANK CLOSURE

(75) Inventor: Angelika Barbara Maria Bauer, Raubling (DE)

(73) Assignee: temtec Fahrzeugtechnik Entwicklungsgesellschaft mbH, Raubling (DE)

( * ) Notice: Subject to any disclaimer, the term of this patent is extended or adjusted under 35 U.S.C. 154(b) by 485 days.

(21) Appl. No.: 10/816,300

(22) Filed: Apr. 1, 2004

(65) Prior Publication Data

US 2005/0039818 A1 Feb. 24, 2005

(30) Foreign Application Priority Data

Apr. 4, 2003 (DE) ................. 103 15 513

(51) Int. Cl.
*B65D 43/18* (2006.01)
*B65D 43/20* (2006.01)
*B65D 55/00* (2006.01)
*B65D 43/14* (2006.01)

(52) U.S. Cl. ............... 220/211; 220/86.1; 220/259.1; 220/812; 220/813; 220/815

(58) Field of Classification Search ............... 220/211, 220/262, 263, 812, 813, 815, 351, 86.2, 86.1, 220/259.2
See application file for complete search history.

(56) References Cited

U.S. PATENT DOCUMENTS

| | | | | |
|---|---|---|---|---|
| 4,030,322 A | * | 6/1977 | Pettit | 70/159 |
| 4,091,958 A | * | 5/1978 | Zemke | 220/291 |
| 5,072,986 A | | 12/1991 | Tai et al. | |
| 5,234,122 A | * | 8/1993 | Cherng | 220/211 |
| 5,377,842 A | * | 1/1995 | Sorini | 206/581 |
| 5,465,861 A | | 11/1995 | Kunz et al. | |
| 6,234,555 B1 | * | 5/2001 | Emmerich et al. | 296/97.22 |
| 6,705,481 B2 | * | 3/2004 | Temmesfeld | 220/86.2 |

FOREIGN PATENT DOCUMENTS

| DE | 19517542 | 11/1996 |
|---|---|---|
| EP | 0 582 025 | 3/1996 |

* cited by examiner

*Primary Examiner*—Anthony D. Stashick
*Assistant Examiner*—Niki M. Eloshway
(74) *Attorney, Agent, or Firm*—Collard & Roe, P.C.

(57) ABSTRACT

A fuel tank closure for closing off a filling channel has a closure part that can be moved between a closed position in which an opening of the filling channel is tightly sealed, and an open position, in which the filling channel is released, in order for a fuel tank to be filled. The closure part is driven by a drive unit that has a motor.

26 Claims, 5 Drawing Sheets

FUEL TANK CLOSURE

CROSS REFERENCE TO RELATED APPLICATIONS

Applicant claims priority under 35 U.S.C. §119 of German Application No. 103 15 513.9 filed Apr. 4, 2003.

BACKGROUND OF THE INVENTION

1. Field of the Invention

The present invention relates to a fuel tank closure for closing off a filling channel, having a closure part that can be moved between a closed position in which an opening of the filling channel is tightly sealed, and an open position, in which the filling channel is released, in order for a fuel tank to be filled.

2. The Prior Art

In the following, "top" is understood to be the region of the fuel tank closure that is close to the opening into which the dispensing nozzle is introduced. Accordingly, "bottom" is understood to be the region that lies closer to the fuel tank.

A fuel tank closure of the type stated initially is known from U.S. Pat. No. 5,465,861. This closure is opened by introducing a dispensing nozzle which moves a projection against the bias of a reset spring. The movement of the spring is transferred to the closure part which opens the closure part. After the tank has been filled and the dispensing nozzle has been retracted, the closure is closed again, by means of the tensed reset spring.

SUMMARY OF THE INVENTION

It is an object of the present invention to provide a fuel tank closure of the type stated initially, which is characterized by increased ease of use and particular operational reliability. In particular, the fuel tank closure should be suitable for automatic tank filling. At the same time, the fuel tank closure should be secured against unauthorized activation.

These objects are accomplished, according to the invention, by providing a fuel tank closure in which the closure part is driven by a drive unit that has a motor. The self-locking that is related with a motor drive has the effect of making it impossible to lift the closure off manually. Therefore there is no need to secure the fuel tank closure or the outer door that covers the closure region, by means of complicated locking systems, such as by way of the central locking system. Instead, it is sufficient if it is assured that only when the ignition key is in place can the drive motor for opening the fuel tank closure be switched on. Operation of the fuel tank closure merely requires activation of a switch, and is therefore extremely convenient.

Surprisingly, it has been found that the extremely complex movement of opening and closing a closure cap can be accomplished by means of a motor drive.

In this connection, a closure part that rests on the edge of the opening, forming a seal, in the closed position, and is pivoted out laterally, with reference to the filling channel, in the open position, has proven to be particularly advantageous. This method of construction assures that no dirt that might have collected on the closed closure can get into the fuel tank when the closure is opened. Instead, the closure is moved towards the side, together with the closure cap.

By means of a compulsory guide, according to another advantageous embodiment of the invention, the result is achieved that the closure part is lifted off the edge of the opening in an approximately axial direction during the opening process, and subsequently is pivoted to the side about a virtual pivot axis that lies crosswise to the longitudinal direction of the filling channel. This method of compulsory guidance has proven to be a very reliable opening and closing mechanism, in combination with a motor drive. In this connection, the virtual pivot axis can lie either in front of (above) the opening of the filling channel, or below the opening of the filling channel.

According to an advantageous embodiment of the invention, the compulsory guide is at least one connecting link guide that has two complementary parts, namely at least one groove, on the one hand, and at least one tab that engages in the groove, on the other hand.

To transfer the drive movement of the motor to the closure part, a construction that includes the following characteristics, individually or in combination, has proven to be advantageous:

the at least one groove has a segment that runs in a straight line in the axial direction, and a subsequent arc-shaped segment that follows the segment that runs in a straight line, in each instance;

the closure part has a cap that fits onto the edge of the opening and one or two struts arranged laterally on the cap;

a force absorption part is arranged on the strut or on the struts, on which forces in the axial direction, for closing and opening the fuel tank closure, can be exerted;

the force absorption part is coupled with an axially movable thrust ring;

the force absorption part is a tab that engages in a recess of the axially movable thrust ring, so that the closure part is articulated to pivot on the thrust ring;

the thrust ring has a thread, so that it can be moved in the axial direction.

This method of construction has the advantage that the opening movement of the closure part is guided so that the closure part is only minimally lifted off the edge of the opening and then pivoted to the side. In this way, the space required before opening can be kept small. This feature is particularly important in the case of passenger cars, in which the fuel filler pipe is generally arranged in a tank depression that can be covered by an outer door of the car body.

If the spatial restrictions are not that strict, it is also advantageous to use a fuel tank closure in which the following characteristics are provided, individually or in combination, for transferring the drive movement of the motor to the closure part:

the compulsory guide has means by which a first edge segment of the closure part can be fixed in place, in articulated manner, near where the closure part assumes the closed position. At the same time, the closure part is freely movable in a second edge segment that lies opposite the first edge segment, and is pivoted about the first edge segment during opening and closing;

the compulsory guide has an articulation part that is joined on one side to the closure part and on the other side to the housing part;

the articulation part is a wire stirrup that is mounted on one side in a hinge arranged on the housing part and on the other side in at least one bore arranged on the closure part. The axes of the hinge and the at least one bore are parallel.

According to a particularly advantageous embodiment of the invention, the drive unit can be driven with a key. Therefore the fuel tank closure can also be opened and closed manually, in case of a disruption in the power supply.

However, a person who is not in possession of the correct key cannot activate the fuel tank closure, because of the self-locking of the drive.

The drive shaft of the motor preferably lies parallel to the axis of the filling channel. This method of construction not only is particularly space-saving, but thanks to this method of construction, also avoids a worm-wheel drive, which demonstrates such strong self-locking that a manual drive would only be possible at the motor shaft. Because of the great gear reduction, however, such a large number of rotations would be required to open or close the fuel tank closure that this possibility is practically eliminated. Using the method of construction according to the invention, on the other hand, a wheel of the drive unit can be selected for manual opening in an emergency, for which both the torque to be applied and the number of required revolutions can be kept within tolerable limits.

To transfer the drive movement of the drive unit to the thrust ring and to the closure part, a pipe piece that is provided with a thread and can be rotated about its longitudinal axis is preferably provided, which surrounds the thrust ring and interacts with a thread of the thrust ring, in order to move the thrust ring in the axial direction.

According to a further embodiment, the closure part of the fuel tank closure is coupled with an outer door of the car body, so that when the closure part is opened, the outer door is also opened. This arrangement not only is convenient for the driver of the vehicle, but also makes the closure suitable for automatic tank filling that will be introduced in the not too distant future. In contrast to the existing planning, the closure can be implemented in an extremely simplified manner because the automatic dispenser is relieved of the task of opening and closing the outer door and the fuel tank closure. Only a single motor is necessary for opening and closing the outer door, opening and closing the fuel tank closure, and unlocking and locking the access to the interior of the tank. The additional effort/expenditure on the vehicle is therefore slight, particularly if one considers that modern vehicles are even now equipped with a motor for locking and unlocking the outer door, which can be eliminated when the closure according to the invention is used.

The mechanical coupling between the closure part of the fuel tank closure and the outer door can take place, in advantageous manner, by providing the closure with a projection that engages in a guide of the outer door.

Operation of the fuel tank closure can take place, for example, by means of an electric button that can be activated by way of the outer door. It is advantageous if the button is wired so that it can be effectively activated only if the central locking system is unlocked, in other words when the vehicle is standing and not locked.

Turning the drive of the fuel tank closure on by way of a remote control or a switch in the interior of the vehicle also has advantages.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
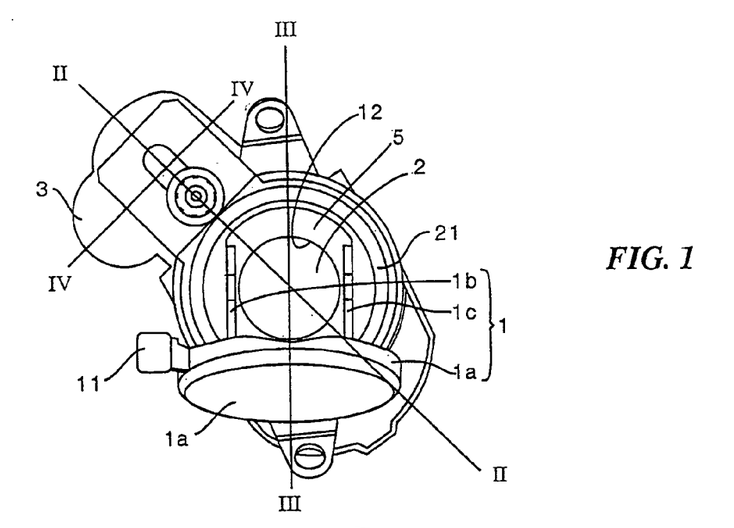
FIG. 1 shows a fuel tank closure according to a first embodiment of the invention, with an opened closure part, in a top view.

The fuel tank closure in FIG. 1 is intended for attachment to a fuel filler pipe (not shown) of a motor vehicle, in order to close it tightly and to release it for the purpose of filling the tank.

In FIG. 1, the opening 2 can be seen, into which a dispenser nozzle (not shown) can be introduced to fill the tank. A closure part 1 serves to close opening 2; it has a cap 1a and two parallel struts 1b and 1c attached to the underside of the cap. When the filler pipe is closed, cap 1a lies on a gasket 21 on the edge 4 of opening 2, forming a seal. A projection 11 projects from the edge of cap 1a, which is configured as a roller in the embodiment shown in FIG. 1. An electric motor 3 serves to open and close closure part 1, which motor pivots the cap by way of a gear reduction drive (cannot be seen in the representation of FIG. 1), as will be explained in detail below.

Figure 2:
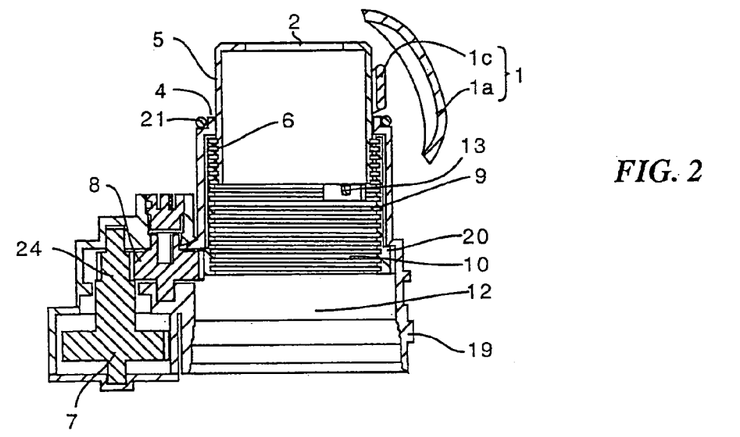
FIG. 2 shows a cross-section along the line II-II from FIG. 1.

From FIG. 2, which shows a cross-section along the line II-II, the internal construction of the fuel tank closure is evident. A housing part 19, which is cylindrical in its rough outline, and forms the filling channel 12 for the fuel, has a gasket 21 at its upper edge 4. A pipe piece 9 is mounted concentrically in housing part 19, so as to rotate, but it is not movable in the axial direction of filling channel 12. Pipe piece 9 has an inside thread 10. At the bottom end of pipe piece 9, there is an outer gear crown 20, by way of which pipe piece 9 can be driven, whereupon it rotates about its longitudinal axis.

Within pipe piece 9, concentric to it, a thrust ring 5 is arranged, which has an outside thread 6 in segments. Outside thread 6 engages in an inside thread 10 of pipe piece 9. Thrust ring 5, which is axially mobile, but because of flattened regions on two longitudinal sides that lie opposite one another (see FIG. 1) cannot be rotated about its longitudinal axis, is consequently moved out of housing part 19 when pipe piece 9 is rotated, and moved into housing part 19 during a rotation in the opposite direction. In FIG. 2, thrust ring 5 is shown in its moved-out position, whereby a circumferential shoulder of thrust ring 5 makes contact with a step of housing part 19 in the end position.

Instead of inside thread 10 of pipe piece 9 and outside thread 6 of thrust ring 5, it is practical if pipe piece 9 and thrust ring 5 are coupled, in terms of movement, by means of a spiral groove on one of the two parts and a tab that engages in the spiral groove on the other of the two parts (not shown). Such a coupling has the advantage that the spiral groove can be designed with different pitches, so that in phases of the closing movement in which greater force is required (for example towards the end of the closing process), the spiral groove is configured with a smaller pitch than in the parts of the spiral groove that are decisive for the other movement phases.

Figure 4:
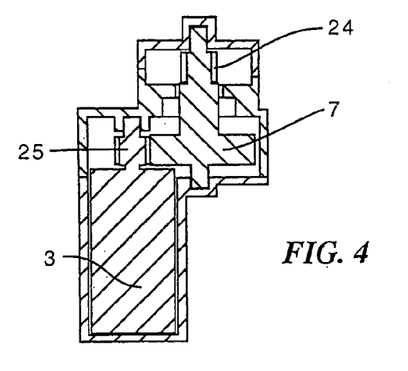
FIG. 4 shows a cross-section along the line IV-IV from FIG. 1.

The rotation drive of pipe piece 9 takes place by way of a step-down gear mechanism that essentially is made up of a gear wheel 7, a gear wheel 8, and a gear wheel 24. Gear wheel 7 is driven by a drive pinion 25 of an electric motor 3 (see FIG. 4). Gear wheel 24 is connected with gear wheel 7 by way of a rigid shaft. Gear wheel 24 meshes with gear wheel 8, which in turn meshes with outer gear crown 20 of pipe piece 9, in order to rotate pipe piece 9.

Gear wheel 8 can be manually driven from the outside of the housing, by way of a closure screw that is provided with a coding, similar to a wheel lug lock, using a special key (not shown), in order to be able to open the fuel tank closure in case of a failure of electric motor 3.

The translation ratios in the drive unit are selected so that when gear wheel 8 is turned manually, the force to be exerted does not become too great, and so that opening the closure can take place with as few rotations as possible.

Figure 3:
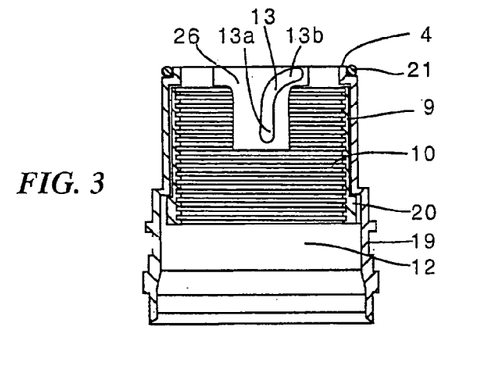
FIG. 3 shows a cross-section along the line III-III from FIG. 1, whereby some parts have been left out, to make the representation easier to understand.

FIG. 3 shows a cross-section along the line III-III in FIG. 1. In FIG. 3, some parts, such as thrust ring 5 and closure part 1, have been left out to make the representation easier to understand. In FIG. 3, cylindrical housing part 19 can once again be seen, in which pipe piece 9 is arranged. At the top edge of housing part 19, an apron 26 is attached, which forms a flat surface. Between apron 26 and the wall of the housing part, there is a cavity in which pipe piece 9 lies and can rotate, unhindered by apron 26. A groove 13 is made in the flat surface of apron 26, which groove has the shape of a banana. The groove has a straight segment 13a, which runs axis-parallel to housing part 19. Its straight-line part 13a is followed by a curved segment 13b. In a mirror image relative to the axis of housing part 19, a similar apron (cannot be seen in the drawing) having the same groove is arranged diametrically opposite apron 26 described above.

Figure 3A:
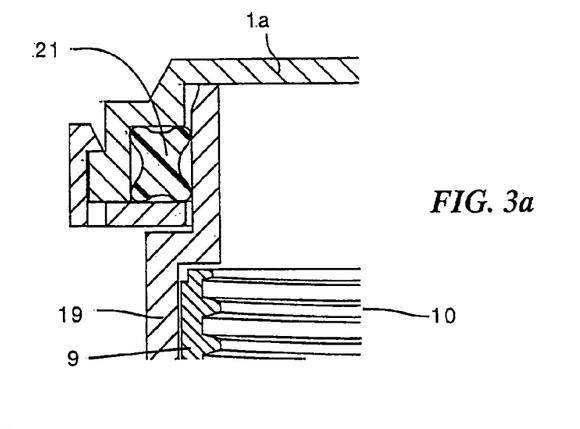
FIG. 3a shows a partial view of a variant of the embodiment of FIG. 1.

In the variant shown in FIG. 3a, a radial gasket 21 is provided. Radial gasket 21 sits in a ring chamber on the inside wall of closure cap 1a, which is open towards the inside. Radial gasket 21 lies against a cylindrical segment of housing part 19, and exercises the sealing function there. The use of this sealing principle is possible because closure part 1 is guided on the sealing seat towards the end of the closing movement, in a parallel displacement that runs in the axial direction. The use of the radial gasket results in a reliably sealed connection between housing part 19 and closure part 1, and particularly ensures that gasket 21 is not damaged over time, by being pressed down too hard.

Figures 5, 6:
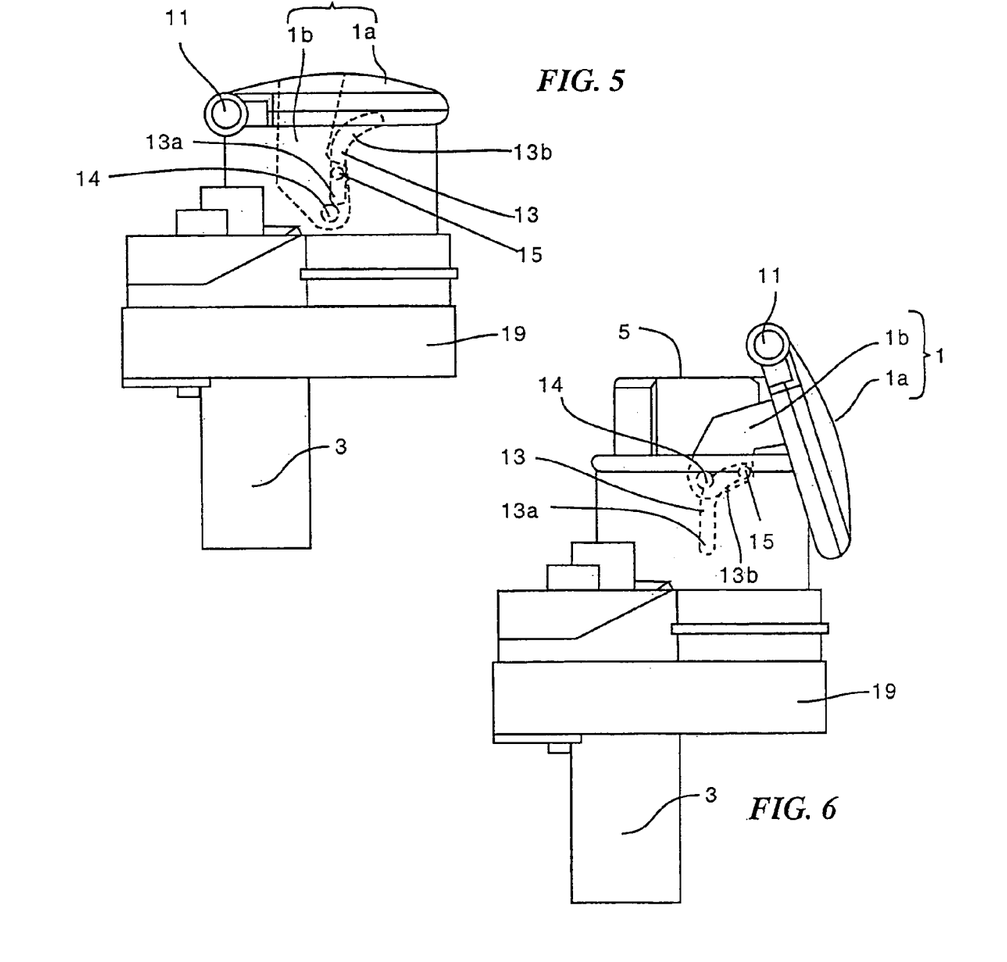
FIG. 5 shows a side view of a fuel tank closure according to the invention, with a closed closure part.
FIG. 6 shows a side view of the fuel tank closure of FIG. 5 with the opened closure part as in FIG. 1.

FIG. 5 shows the closed fuel tank closure from the side. The closure part can be seen, which is made up of cap 1a and two parallel struts 1b and 1c, arranged on the underside of cap 1a, of which only strut 1b can be seen in FIG. 5. In the vicinity of the lower end of strut 1b, a tab 14 is arranged, which projects beyond the surface of strut 1b towards the inside, i.e. directed towards the center axis of the closure part. Above tab 14, there is a tab 15, which projects beyond the surface of strut 1b towards the outside, i.e. in the direction opposite the direction of tab 14. Strut 1c, which cannot be seen in FIG. 5, is symmetrical to strut 1b, i.e. it has a tab directed towards the inside and a tab directed towards the outside, at the corresponding positions.

FIG. 6 shows the fuel tank closure from the side as in FIG. 5, but in the open state. In FIG. 6, it can be seen that closure part 1 is tilted to the side, so that the filling channel is open. It can also be seen that thrust ring 5 has been moved out of housing part 19, towards the top. Tab 14 of strut 1b of closure part 1 is mounted in a bore of thrust ring 5, so that closure part 1 is coupled with thrust ring 5, whereby, however, closure part 1 can be rotated about an axis defined by tab 14, with reference to thrust ring 5. Tab 15 that is directed towards the outside engages in groove 13 of apron 26, which is rigidly connected with housing part 19.

The opening and closing process will be explained below, using FIGS. 5 and 6, whereby reference is also made to FIGS. 1 to 4. To open the fuel tank closure, motor 3 is driven, so that pipe piece 9 is put into rotation by way of the step-down gear mechanism 7, 8, and axially displaces the thrust ring by way of its thread 6, specifically in the upward direction, i.e. in the direction towards the opening of the filling channel, until thrust ring 5 assumes the position shown in FIG. 6, in which it projects out of housing part 19. This axial displacement of thrust ring 5 is transferred to tab 14 of the closure part, which acts as a force absorption part. Since tab 15 of strut 1b that is directed outward, i.e. the corresponding tab of strut 1c that is directed outward, is guided in groove 13, the closure part is not only lifted during the axial displacement of thrust ring 5, but also pivoted to the side, as will be explained in detail below. During the initial phase of the movement of thrust ring 5, tab 15 lies in straight segment 13a of groove 13 that runs in the axial direction, so that it, just like tab 14, is moved parallel to the longitudinal axis of the thrust ring. The consequence is a corresponding parallel displacement of closure part 1, the cap 1a of which lifts off the edge of the opening of the filling channel. In this phase of the opening process, no pivoting of closure part 1 takes place as yet. As the movement of thrust ring 5 proceeds, tab 15 gets into curved segment 13b of groove 13, so that its movement in the axial direction slows down and instead, it performs a movement crosswise to the longitudinal direction, whereby closure part 1 is pivoted laterally, until it finally assumes the position shown in FIG. 6.

The closing process takes place in the opposite sequence, for which purpose motor 3 has to be driven in the opposite direction of rotation, and thrust ring 5 is moved into housing part 19. In this way, the closure part is pivoted back into a position above the opening of the filling channel, whereupon it is moved back onto the opening of the filling channel, in the axial direction, in a parallel displacement. The cap of the closure part can be drawn firmly against gasket 21 (FIG. 2) in the end phase of the closing movement, so that the seat is sufficiently tight. The axial movement of the closure part in the end phase of the closing movement also makes it possible to use a radial gasket, which assures an even better seal.

As is evident from a comparison of FIGS. 5 and 6, the roller 11 that is arranged on cap 1a of closure part 1 moves on an arc-shaped track during the opening movement of the closure part 1. In the following, it will be explained, using FIGS. 7 to 8, how the movement of roller 11 can be used to open and close an outer door of a motor vehicle.

Figure 7:
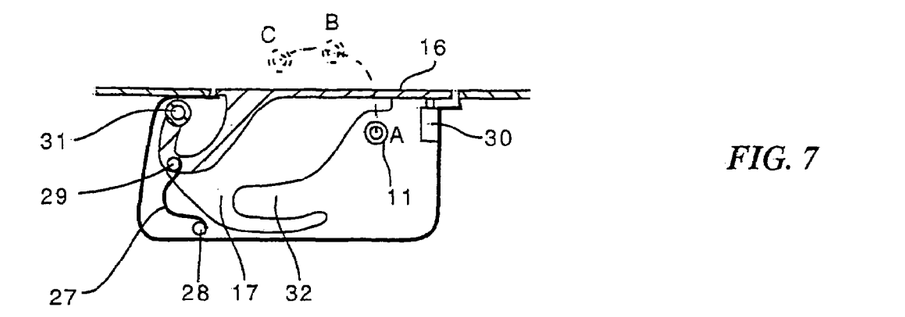
FIG. 7 shows, in schematically simplified form, a cross-section through the area of a motor vehicle body part in which the fuel filler pipe (not shown) is arranged, in which the outer door is closed.

FIG. 7 shows a cross-section through the region of a motor vehicle body part in which the fuel filler pipe is arranged. The fuel filler pipe and the fuel tank closure are not shown, in order to make the drawing easier to understand. Only roller 11 of the fuel filler pipe is shown; it moves on an arc-shaped track. The track is shown with a broken line. The start of the movement track (closure closed) is indicated as "A", "B" refers to an intermediate position, and "C" shows the location of roller 11 in the end position.

An outer door 16 is affixed to the motor vehicle body by means of an articulation 31. The outer door closes off a tank depression in which the fuel filler pipe of a motor vehicle is arranged, and is opened to fill the tank and closed again after the tank has been filled. The outer door is provided with a "beyond-dead-point" spring 27. Beyond-dead-point spring 27 is a pressure spring that is attached at its one end with a tab 28 connected with the car body, and at its opposite end with a tab 29 that is connected with outer door 16. The beyond-dead-point spring presses outer door 16 further into the closed position, when outer door 16 is closed, as shown in FIG. 1. On the inside of outer door 16, a connecting link profile 17 is arranged, which interacts with roller 11 of the fuel tank closure. The connecting link profile has an oblong recess 32. Electric motor 3 of the fuel tank closure is electrically connected with a button 30. Button 30 is attached to the body of the motor vehicle so that it can be activated by way of outer door 16. Pressure against outer door 16 moves outer door 16 slightly towards button 30, whereby button 30 is activated and motor 3 is turned on so that it opens the fuel tank closure. In this connection, roller 11 moves on the track shown with a broken line and makes contact with connecting link profile 17, with the consequence that outer door 16 is pressed into the open position, counter to the force of beyond-dead-point spring 27, by roller 11.

Figure 8:
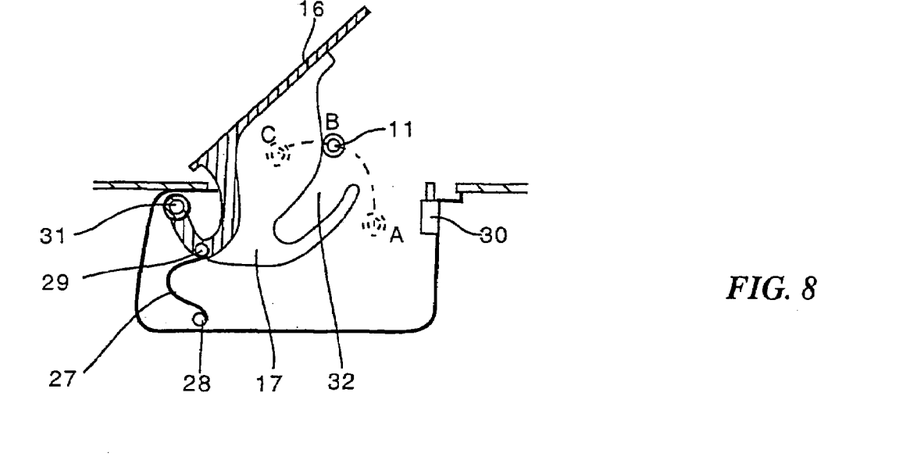
FIG. 8 shows the same region with the outer door partly open.

FIG. 8 shows an intermediate stage of the opening process.

Figure 9:
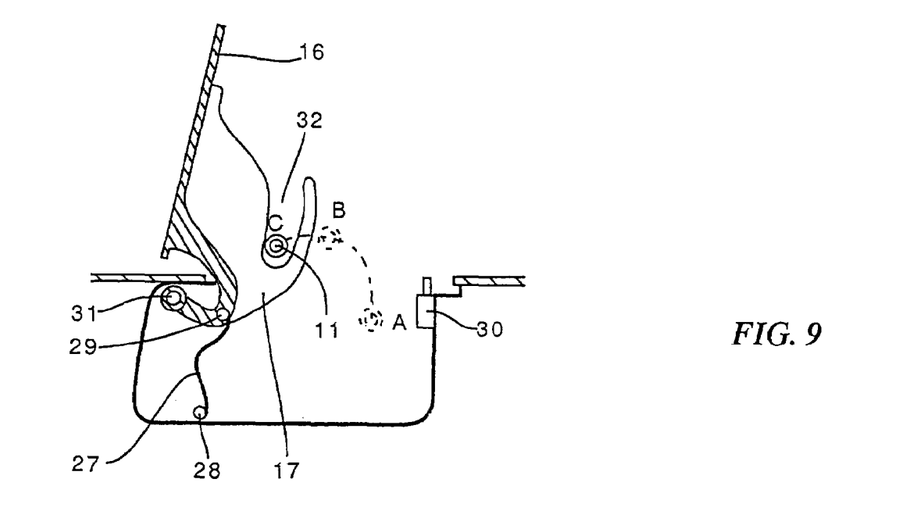
FIG. 9 shows the same region with the outer door completely open.

FIG. 9 shows outer door 16 completely open. Beyond-dead-point spring 27 now presses outer door 16 into the open position. Roller 11 of the fuel tank closure has now moved into recess 32 of connecting link profile 17, so that it is surrounded on both sides. After the tank has been filled, a closing command is issued to the motor control (not shown), by means of manually pressing button 30. Thereupon motor 3 is driven in the closing direction. Because roller 11 is located in recess 32 of connecting link profile 17, and surrounded on both sides, it is ensured that outer door 16 follows the movement of roller 11 and moves in the closing direction until the end position shown in FIG. 7 has been reached, whereby the outer door is pressed in the direction towards the closed position by beyond-dead-point spring 27 during the last phase of the closing movement.

In case of a failure of motor 3, outer door 16 can be opened by hand, since roller 11 lies outside recess 32 in the closed position. Afterwards, gear wheel 8 can be manually driven using a special key, until the fuel tank closure is open. In this connection, outer door 16 is held in the open position by means of beyond-dead-point spring 27. Manual closing after the tank has been filled then proceeds in the opposite sequence of movements.

Figure 10:
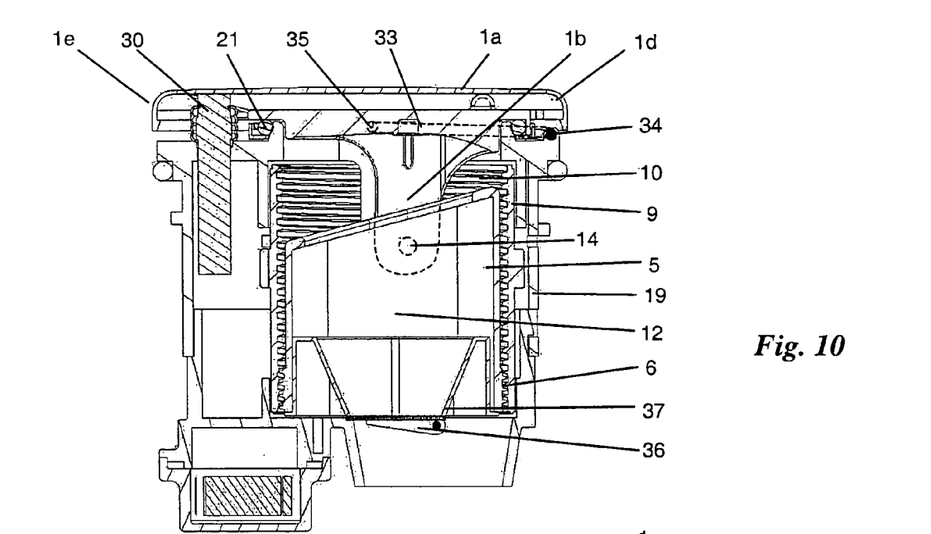
FIG. 10 shows a second embodiment of a fuel tank closure in longitudinal cross-section, with the flap closed.

FIG. 10 shows another embodiment of a fuel tank closure according to the invention, in longitudinal cross-section. A housing part 19, cylindrical in its rough outline, which forms filling channel 12 for the fuel, has a gasket 21 at its upper edge. A pipe piece 9 is mounted concentrically in housing part 19, so as to rotate, but it is not movable in the axial direction of filling channel 12. Pipe piece 9 has an inside thread 10. As in the exemplary embodiment according to FIG. 2, pipe piece 9 is driven by way of a gear mechanism unit, with an electric motor (which cannot be seen, however, in the cross-sectional representation selected) whereupon it rotates about its longitudinal axis.

Within pipe piece 9, concentric to it, a thrust ring 5 is arranged, which has an outside thread 6 in segments. Outside thread 6 of thrust ring 5 engages in an inside thread 10 of pipe piece 9. Thrust ring 5, which is flattened off on two longitudinal sides that lie opposite one another, is axially mobile, but cannot be rotated about its longitudinal axis, and is consequently moved out of housing part 19 when pipe piece 9 is rotated, and moved into housing part 19 during a rotation in the opposite direction. In FIG. 10, thrust ring 5 is shown in its moved-in position.

Instead of inside thread 10 of pipe piece 9 and outside thread 6 of thrust ring 5, it is practical if pipe piece 9 and thrust ring 5 are coupled, in terms of movement, by means of a spiral groove on one of the two parts and a tab that engages in the spiral groove on the other of the two parts (not shown). This coupling has the advantage that the spiral groove can be designed with different pitches. Accordingly, in phases of the closing movement that require greater force (for example towards the end of the closing process), the spiral groove has a smaller pitch than the parts of the spiral groove that are decisive for the other movement phases.

In FIG. 10, the closure part can be seen, which includes cap 1a and two parallel struts 1b and 1c, arranged on the underside of the cap 1a, of which only strut 1b can be seen in FIG. 10. Near the lower end of strut 1b, a tab 14 is arranged, which projects beyond the surface of strut 1b towards the inside, i.e. directed towards the center axis of the closure part 1. The second strut 1c, which cannot be seen in FIG. 10, is symmetrical to strut 1b, i.e. it also has a tab directed towards the inside, at the corresponding position.

An approximately U-shaped wire stirrup 33 is mounted in bores 35 of closure part 1, at its two ends, so as to rotate. The axis of bores 35 the location of which will be explained in greater detail below, in connection with FIG. 11, lies in the vicinity of a diameter line of closure part 1 and is parallel to the axis of tab 14. The center part of wire stirrup 33 is mounted in a hinge 34 that is connected with housing part 19. Hinge 34 lies at the edge of the opening of the filling channel and defines an axis of rotation that is parallel to the axis of bores 35 in which the two ends of wire stirrup 33 are mounted. Closure part 1 thereby is subject to a compulsory guide, which is defined by the axis of tab 14, the axis of hinge 34 and the axis of bores 35.

Figure 11:
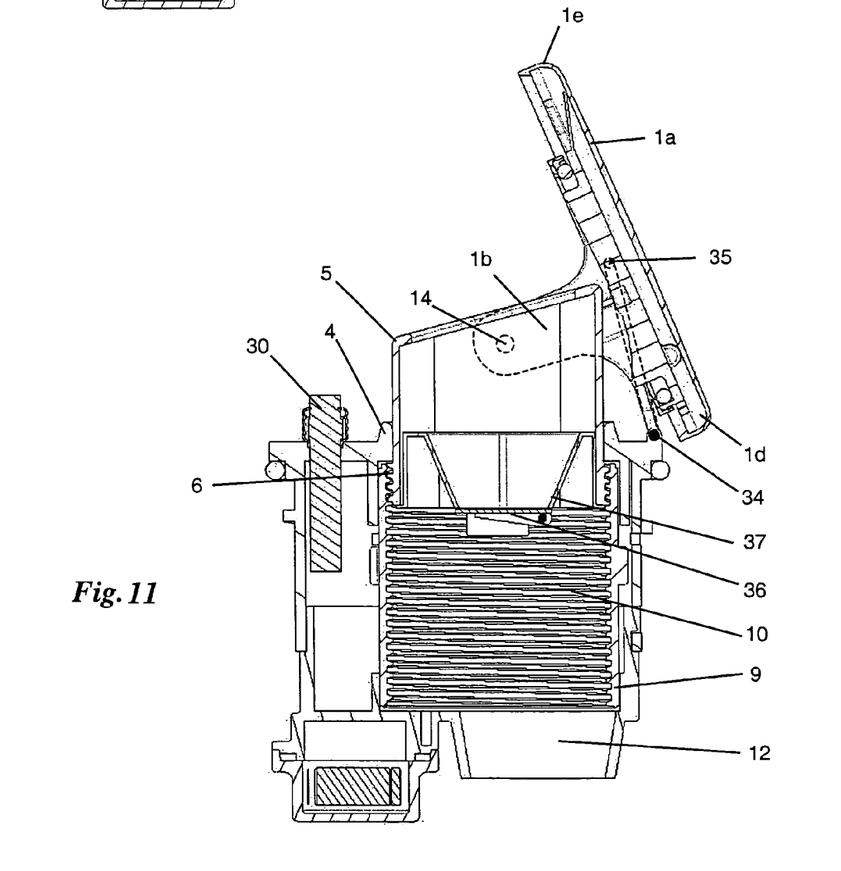
FIG. 11 shows the second embodiment of the fuel tank closure in longitudinal cross-section, with the flap open.

FIG. 11 shows the fuel tank closure in the open state. In FIG. 11, it can be seen that closure part 1 is standing up, so that the filling channel is open. It can also be seen that thrust ring 5 is moved out of housing part 19, towards the top. Tab 14 of strut 1b of closure part 1 is mounted in a bore of thrust ring 5, so that closure part 1 is coupled with thrust ring 5, whereby closure part 1 can, however, be rotated with reference to thrust ring 5, about the axis defined by tab 14. In the axial displacement of tab 14, a pivoting movement is exerted on closure part 1 by the compulsory guide defined by the axis of tab 14, the axis of hinge 34, and the axis of bores 35, which has the end result that closure part 1 assumes the position shown, in which filling channel 12 is released for filling the tank. In principle, wire stirrup 33 acts as a means that holds the edge segment 1d of closure part 1 in place in the vicinity of its closed position, while moving out thrust part 5 has the effect that the opposite edge segment 1e is made to stand up.

In FIGS. 10 and 11, it can furthermore be seen that a shutter 37 that can be closed with a flap 36 is arranged in the inside of thrust part 5, which ensures that only dispensing nozzles that have an outside diameter smaller than the opening of shutter 37 can be introduced into the filling channel.

Figure 12:
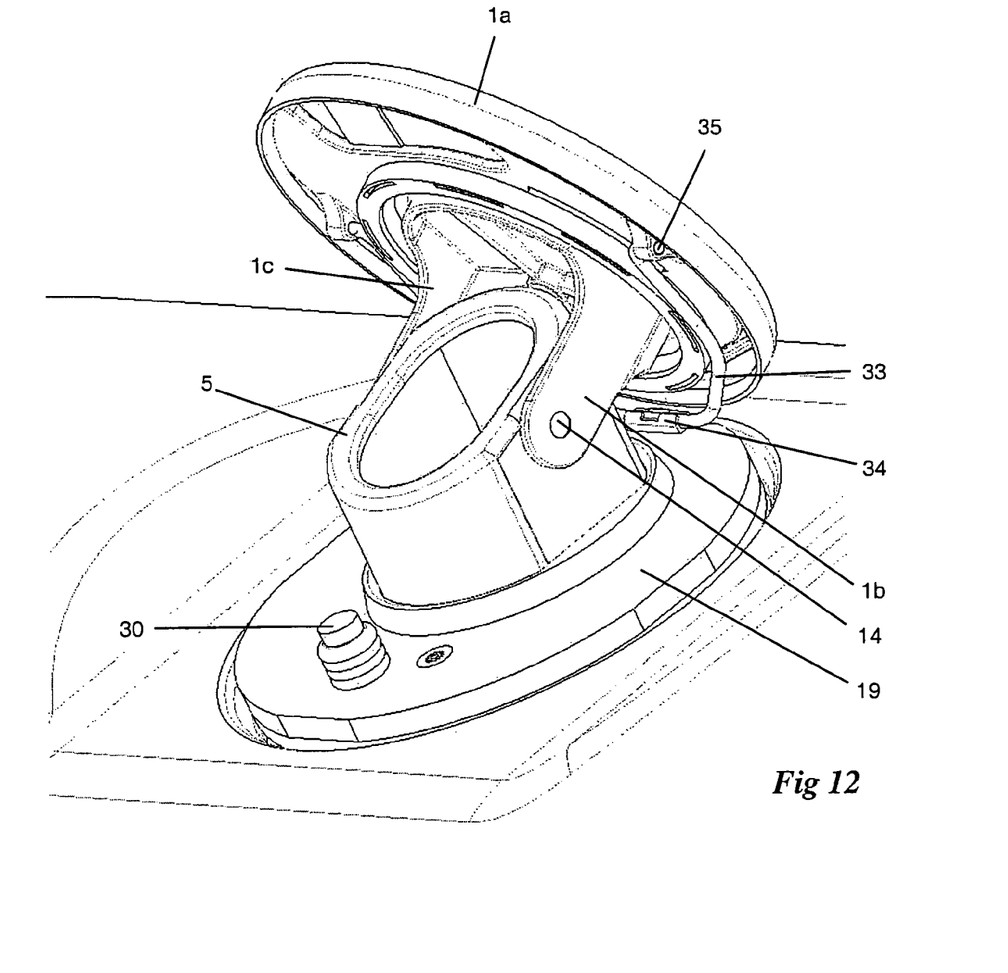
FIG. 12 shows a perspective representation of the fuel tank closure of the second embodiment.

FIG. 12 shows the fuel tank closure in a perspective view, in the open state, ready for filling the tank of the vehicle.

Opening of the fuel tank closure takes place in that pressure is exerted on closed cap 1a (see FIG. 10), whereupon a switch 30 is activated and the electric motor (not shown) is driven. In this connection, pipe piece 9 with its inside thread 10 is put into rotation by way of the drive unit that cannot be seen in the cross-sectional view of FIGS. 10 and 11. By means of the interaction with thread 6 of thrust ring 5, thrust ring 5 is displaced axially, specifically in the upward direction, i.e. in the direction towards the opening of the filling channel, in which thrust ring 5 assumes the position shown in FIGS. 11 and 12, in which it projects out of the housing part 19. This axial displacement of thrust ring 5 is transferred to tab 14 of the closure part, which acts as a force absorption part. The compulsory guide of the closure part, which is defined by three articulations, namely the axis of tab 14, the axis of hinge 34, and the axis of bores 35, has the effect that closure cap 1a is pivoted into the position shown in FIGS. 11 and 12. To close the fuel tank closure, switch 30 that is now standing free is pressed again, whereby the electric motor is driven in the opposite direction of rotation, which results in closing of the fuel tank closure.

Although only a few embodiments of the present invention have been shown and described, it is to be understood that many changes and modifications may be made thereunto without departing from the spirit and scope of the invention as defined in the appended claims.

What is claimed is:

1. A fuel tank closure for closing off a filling channel comprising:
   (a) a closure part movable between a closed position in which an opening of the filling channel is sealed and an open position in which the filling channel is released in order to fill a fuel tank, said closure part sitting on an edge of the opening to form a seal in the closed position, and being pivoted laterally relative to the filling channel in the open position;
   (b) a drive unit comprising a motor driving said closure part; and
   (c) a compulsory guide guiding said closure part, lifting said closure part off the edge of the opening in an approximately axial direction during opening of the filling channel, and subsequently pivoting said closure part laterally about a pivot axis lying transverse to a longitudinal direction of the filling channel;
   wherein said closure part comprises a first edge segment and a second edge segment lying opposite said first edge segment, and said compulsory guide has means for fixing said first edge segment in place, in articulated manner near a position in which said closure part assumes the closed position, while allowing pivoting of said second edge segment about said first edge segment during opening and closing;
   wherein said compulsory guide has an articulation part joined to said closure part on a first side, and mounted on a housing part, on a second side; and
   wherein said articulation part is mounted in a hinge arranged on said housing part on the second side, and in at least one bore arranged on said closure part on the first side, said hinge and said at least one bore having parallel axes.

2. The fuel tank closure according to claim 1, wherein the pivot axis lies inside the filling channel.

3. The fuel tank closure according to claim 1, wherein the pivot axis lies in front of the opening of the filling channel.

4. The fuel tank closure according to claim 1, wherein said closure part has a cap that fits onto the edge of the opening and two struts arranged laterally on the cap.

5. The fuel tank closure according to claim 4, further comprising a force absorption part arranged on at least one of the struts on which forces in an axial direction, for closing and opening the fuel tank closure, can be exerted.

6. The fuel tank closure according to claim 5, further comprising an axially movable thrust ring coupled to said force absorption part.

7. A fuel tank closure for closing off a filling channel comprising:
   (a) a closure part movable between a closed position in which an opening of the filling channel is sealed and an open position in which the filling channel is released in order to fill a fuel tank, said closure part sitting on an edge of the opening to form a seal in the closed position, and being pivoted laterally relative to the filling channel in the open position, said closure part having a cap that fits onto the edge of the opening and two struts arranged laterally on the cap;
   (b) a drive unit comprising a motor driving said closure part;
   (c) a force absorption part arranged on at least one of the struts on which forces in an axial direction, for closing and opening the fuel tank closure, can be exerted; and
   (d) an axially movable thrust ring coupled to said force absorption part;
   wherein said drive unit drives a threaded pipe piece, said pipe piece being rotatable about a longitudinal axis of said pipe piece, said pipe piece surrounding said thrust ring and interacting with a thread of said thrust ring in order to move said thrust ring axially.

8. The fuel tank closure according to claim 7, wherein said compulsory guide comprises at least one connecting link guide that has two complementary parts comprising at least one groove and at least one tab that engages in the groove.

9. The fuel tank closure according to claim 8, wherein said at least one connecting link guide has two grooves in each of which a respective guide tab engages.

10. The fuel tank closure according to claim 8, wherein each of said at least one groove has a first segment that runs in a straight line in the axial direction, and a second arc-shaped segment that follows said first segment.

11. The fuel tank closure according to claim 7, wherein said force absorption part comprises a tab that engages in a recess of the axially movable thrust ring, so that said closure part is articulated to pivot on said thrust ring.

12. The fuel tank closure according to claim 7, wherein said thrust ring has a thread for moving said thrust ring axially.

13. The fuel tank closure according to claim 7, wherein said motor comprises an electric motor.

14. The fuel tank closure according to claim 7, wherein said drive unit has a step-down gear mechanism.

15. The fuel tank closure according to claim 14, wherein said drive unit has a gear wheel that can be exteriorly driven using a key.

16. The fuel tank closure according to claim 7, wherein said motor has a drive shaft that lies parallel to an axis of the filling channel.

17. The fuel tank closure according to claim 7, wherein said closure part is connected with an outer door of a car body so that when said closure part is opened, the outer door is also opened.

18. The fuel tank closure according to claim 17, wherein said closure part has a projection that engages in a connecting link profile of the outer door.

19. The fuel tank closure according to claim 7, wherein said closure part is connected with an outer door of a car body, so that when said closure part is closed, the outer door is also closed.

20. The fuel tank closure according to claim 7, wherein said motor is controlled by means of a remote control.

21. The fuel tank closure according to claim 7, wherein said motor is controlled by means of a switch in an interior portion of a vehicle.

22. The fuel tank closure according to claim 7, further comprising a shutter that can be closed with a flap, said shutter being arranged in the filling channel and limiting introduction of dispensing nozzles into the filling channel to dispensing nozzles having diameters no greater than a selected value.

23. The fuel tank closure according to claim 22, wherein said shutter that can be closed with the flap is arranged in said thrust ring.

24. A fuel tank closure for closing off a filling channel comprising:

(a) a closure part movable between a closed position in which an opening of the filling channel is sealed and an open position in which the filling channel is released in order to fill a fuel tank; and (b) a drive unit comprising a motor driving said closure part;

wherein said closure part is connected with an outer door of a car body, so that when said closure part is closed, the outer door is also closed; and wherein the outer door has an electric button for turning on and off said motor.

25. The fuel tank closure according to claim 24, wherein the button is coupled with a central locking system.

26. The fuel tank closure according to claim 24, wherein the button is arranged so that it can be activated by means or pressure on the closed outer door.

* * * * *